United States Patent [19]  [11] 4,014,518
Lapp  [45] Mar. 29, 1977

[54] CABLE TENSIONING DEVICE

[76] Inventor: Ellsworth W. Lapp, c/o Lapp Engineering 6060 S. 11th St., Rockford, Ill. 61109

[22] Filed: Feb. 23, 1976

[21] Appl. No.: 660,368

[52] U.S. Cl. .................................................. 254/69
[51] Int. Cl.² ......................................... B66F 1/00
[58] Field of Search ............................. 254/51–56, 254/66–82

[56] References Cited

UNITED STATES PATENTS

| 1,199,112 | 9/1916 | Rees | 254/66 |
| 1,447,536 | 3/1923 | Elder | 254/79 |
| 2,864,582 | 12/1958 | Hall | 254/51 |
| 3,545,723 | 12/1970 | Raley | 254/79 |
| 3,616,651 | 11/1971 | Chang et al. | 254/105 |
| 3,685,801 | 8/1972 | Ahlgren | 254/105 |

Primary Examiner—Al Lawrence Smith
Assistant Examiner—Robert C. Watson
Attorney, Agent, or Firm—Leydig, Voit, Osann, Mayer & Holt, Ltd.

[57] ABSTRACT

One end portion of a cable is gripped by one head and the opposite end portion of the cable is gripped by another head prior to the heads being spread apart to pull the cable end portions in opposite directions and impart tension to the cable. Without losing the initially imparted tension, one head may be released from and returned reversely along the cable and then may be shifted through another active stroke to place additional tension in the cable.

4 Claims, 8 Drawing Figures

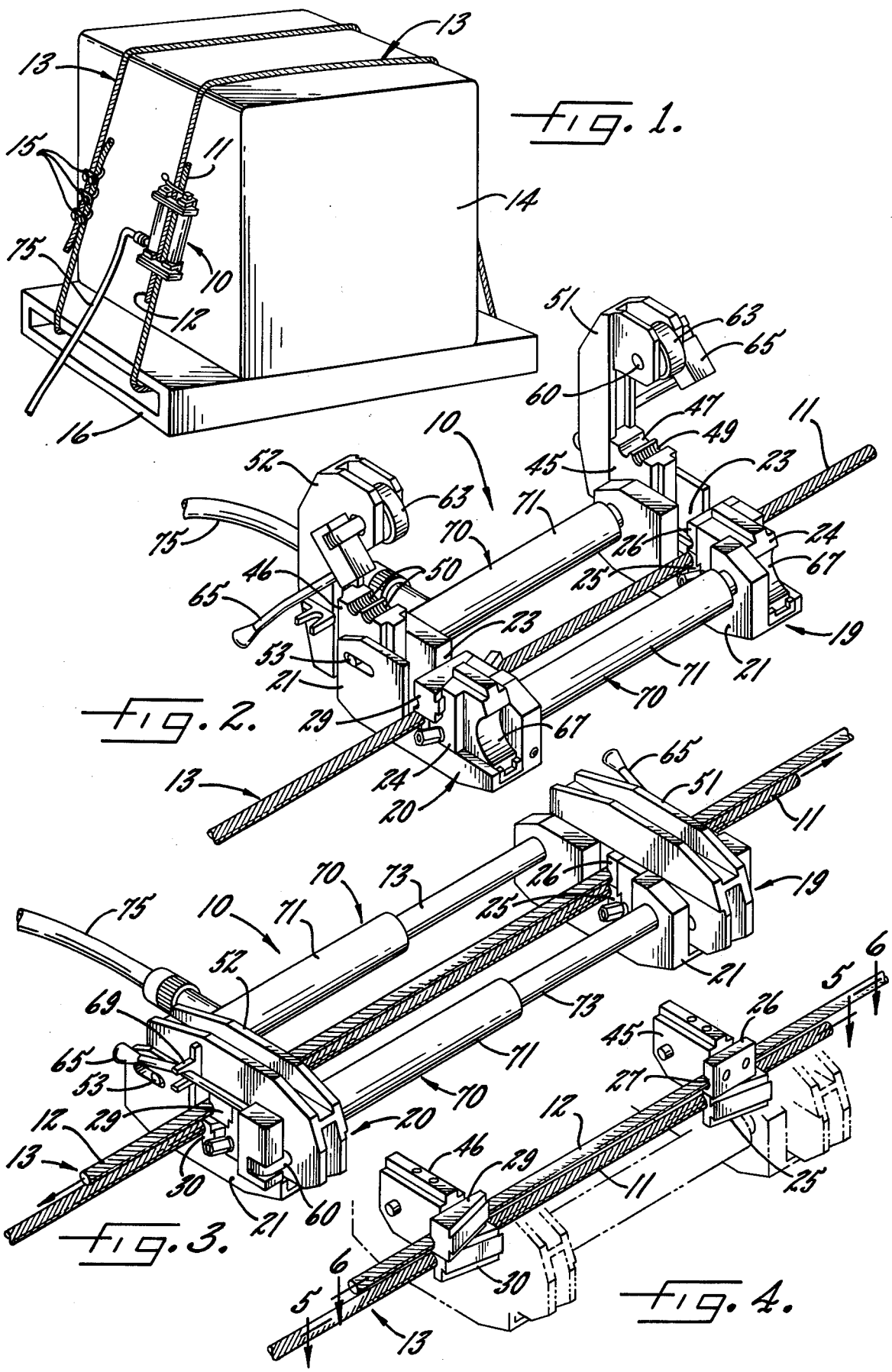

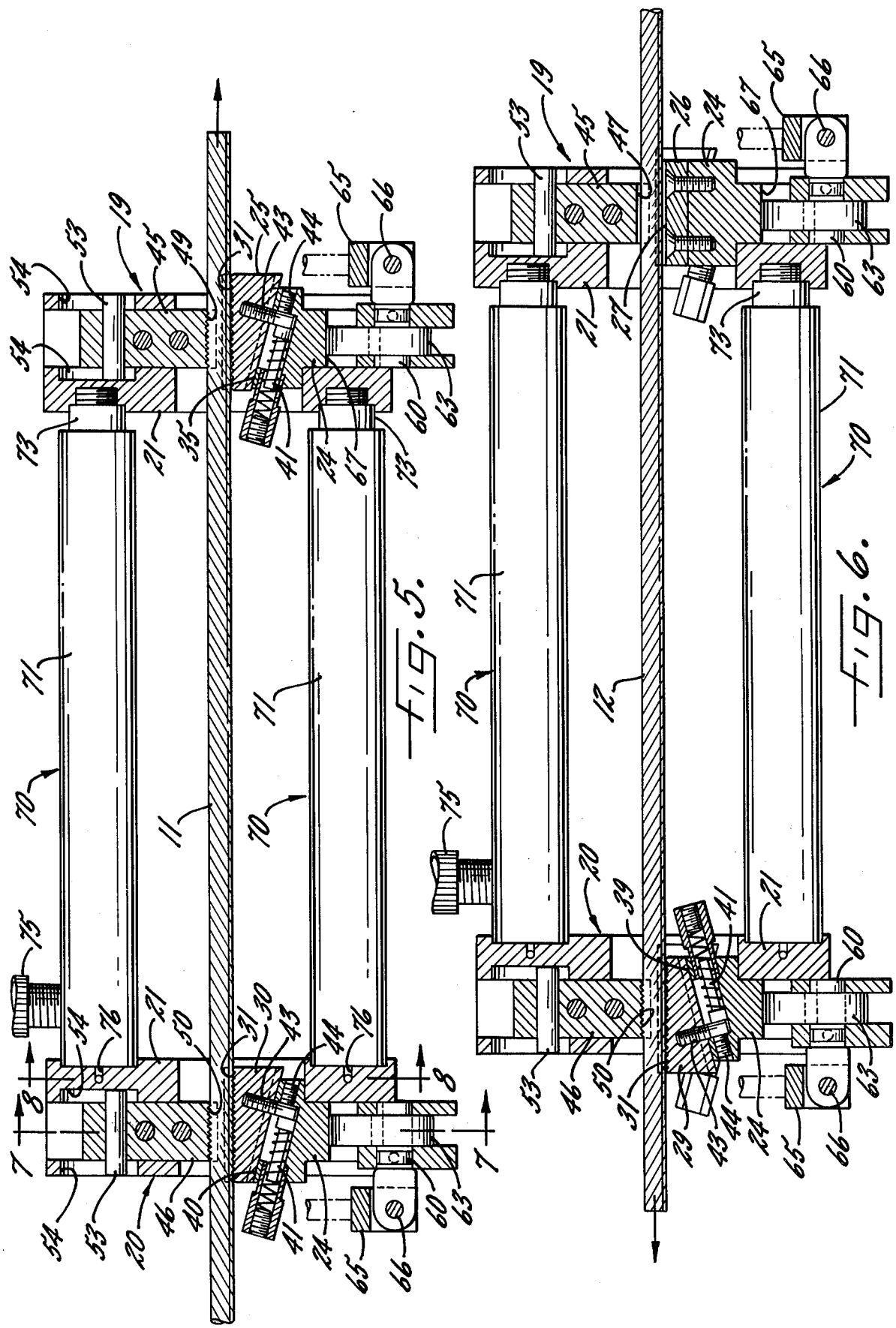

CABLE TENSIONING DEVICE

BACKGROUND OF THE INVENTION

This invention relates to a device for drawing a cable or the like tightly around an article and for placing the cable in tension prior to the overlapped end portions of the cable being fastened together to maintain the tension and keep the article rigidly secured by the cable.

SUMMARY OF THE INVENTION

The general objects of the present invention are to provide a new and simplified cable tensioning device which has relatively large capacity but which is comparatively light in weight and easily portable; which is relatively durable and trouble-free in operation as a result of being substantially uniformly loaded during the tensioning operation; which tensions the entire cable between the points where the overlapping end portions are fastened together; and which is capable of a repetitive hitch stroke to impart the necessary tension to the cable.

The invention also resides in the unique coaction between the components of the device and particularly in the use of novel self-energizing elements for gripping and pulling the cable to impart tension thereto.

These and other objects and advantages of the invention will become more apparent from the following detailed description when taken in conjunction with the accompanying drawings.

BRIEF DESCRIPTION OF THE DRAWINGS

FIG. 1 is a perspective view showing a cable being tightened around an article by a new and improved cable tensioning device embodying the unique features of the present invention.

FIG. 2 is a perspective view of the device and shows one end portion of the cable loaded into the device.

FIG. 3 also is a perspective view of the device but shows the cable being tensioned by the device.

FIG. 4 is a fragmentary perspective view which primarily shows the gripping and pulling elements.

FIGS. 5 and 6 are enlarged cross-sections taken substantially along the lines 5—5 and 6—6, respectively, of FIG. 4.

DETAILED DESCRIPTION OF THE PREFERRED EMBODIMENT

Figure 7:
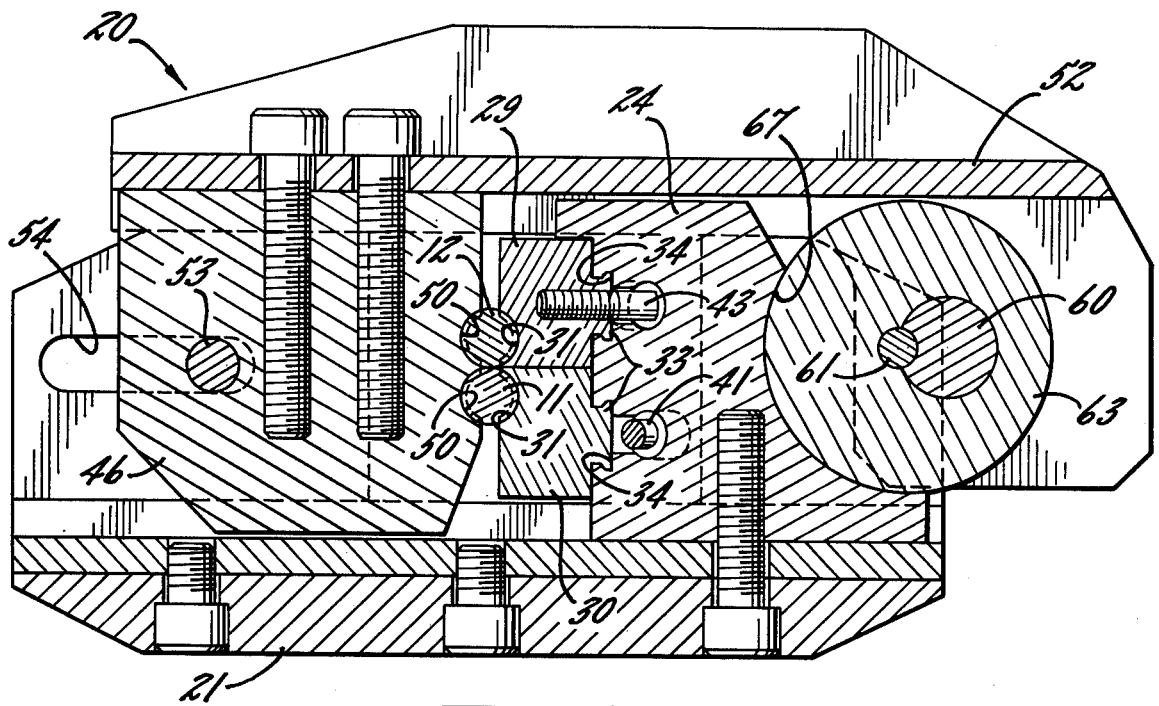
FIGS. 7 and 8 are enlarged cross-sections taken substantially along the lines 7—7 and 8—8, respectively, of FIG. 5.

As shown in the drawings for purposes of illustration, the invention is embodied in a device 10 for operating on the two overlapped end portions 11 and 12 of a cable 13 to draw the cable tightly around an article 14 and to place tension in the cable preparatory to the end portions of the cable being fastened together by one or more clamps 15. In the present instance, the two cables shown are of the braided wire type but it should be appreciated that the device 10 may be used to tighten and tension any elongated flexible element and that the term "cable" as used herein is intended to encompass such elements in general. Also, the article 14 has been shown simply as being a large box-like item which is secured to a skid or pallet 16 by two cables. The article could, however, be a massive farm implement or the like which is secured by cables to a flat-bed railroad car, thus requiring considerable tension in the cables to keep the implement rigidly anchored under the high shock loads normally imposed during rail transit.

In accordance with the present invention, the tensioning device 10 is constructed to have comparatively high pull capacity so that the necessary high tension can be placed in the cable 13 but, at the same time, is relatively light in weight and thus capable of being easily moved about and handled by a single operator. In spite of its low weight, the device 10 is durable and capable of a long service life since substantially uniform stresses are imposed on the device as it tensions the cable. The tensioning device is further characterized by its ability to tension the cable throughout virtually its entire length and to pull the cable through successive tensioning strokes without need of applying the clamps 15 to the cable between such strokes.

In general, the tensioning device 10 includes two substantially but not precisely identical end members or heads 19 and 20 spaced from one another along the length of the cable 13 and each adapted to receive the two lapped end portions 11 and 12 of the cable. After the cable end portions have been loaded into the heads, the end portion 11 (hereinafter called the forward cable end portion) is securely clamped to the forward head 19 while the other or rear cable end portion 12 is clamped to the rear head 20. Thereafter, the longitudinal spacing between the heads is changed, preferably by spreading the heads apart, thereby to pull the clamped end portions in opposite directions so as to draw the cable tightly around the article 14 and impart tension to the cable. If the desired tension is placed in the cable after the heads have been spread, the clamps 15 may be applied to those parts of the overlapped cable portions between the heads and the latter may be unclamped from the cable. If, on the other hand, additional tension is required, the forward head 19 may be unclamped from the forward cable portion 11, moved rearwardly toward the rear head 20, re-clamped to the forward cable portion, and again stroked forwardly to cause the cable end portions to be further pulled in opposite directions prior to application of the clamps 15. During the time the front head 19 is unclamped from the forward cable end portion and is being moved rearwardly, both the forward and the rear cable portions are clamped by the rear head 20 so as to retain the tension imparted to the cable during the previous stroke.

More specifically, each of the heads 19 and 20 includes a substantially U-shaped bottom member 21 (FIG. 2) which defines an upwardly opening cable-receiving opening or throat 23 into which both cable end portions 12 and 13 are placed when the tensioning device 10 is loaded. Bolted rigidly to each bottom member and located on the outer side of the throat is a mounting block 24. The mounting block on the forward head 19 supports a lower gripping and pulling element 25 (FIGS. 4 and 5) for the forward cable end portion 11 and further supports a guide piece 26 (FIGS. 4 and 6) for supporting and guiding part of the rear cable end portion 12. Herein, the guide piece 26 is attached rigidly to the adjacent mounting block 24 and is formed with a smooth and substantially semi-cylindrical groove 27 for receiving the rear cable end portion 12.

The mounting block 24 on the rear head 20 supports an upper gripping and pulling element 29 (FIGS. 4, 6 and 7) for the rear cable end portion 12 and further supports a lower gripping element 30 (FIGS. 4, 5 and 7) for the forward cable end portion 11. Each of the gripping elements 25, 29 and 30 is formed with a substantially semi-cylindrical, cable-receiving groove 31 (FIG. 7) which is suitably serrated to enable the gripping element to bite into and securely clamp the cable 13. Also, each gripping element is in the form of a substantially wedge-shaped block having a tongue 33 which is dove-tailed into a groove 34 in the inner face of the associated mounting block 24, the tongue-and-groove joints serving to captivate the gripping elements on the mounting blocks while permitting the elements to slide relative to the blocks in a direction extending longitudinally of the cable 13.

In carrying out the invention and for a purpose to be explained subsequently, the mounting block 24 on the forward head 19 is formed with an inclined wedge surface 35 (FIG. 5) which opposes and engages the outer wedging face of the gripping element 25 while the mounting block 24 on the rear head 20 is formed with upper and lower inclined wedge surfaces 39 (FIG. 6) and 40 (FIG. 5) disposed in opposing engagement with the outer wedging faces of the gripping elements 29 and 30, respectively. The gripping elements 25 and 30 are both located such that their "fat" ends face forwardly (see FIGS. 4 and 5), and the opposing wedge surfaces 35 and 40 slope outwardly upon progressing forwardly. Thus, a wedging action results and the gripping elements 25 and 30 are pressed inwardly by the wedging surfaces 35 and 40 if the wedging surfaces are either moved forwardly along the gripping elements or if the gripping elements 25 and 30 are moved rearwardly along the wedging surfaces 35 and 40. Conversely, the gripping elements 25 and 30 are released from the wedging action if the wedging surfaces 35 and 40 are either moved rearwardly along the gripping elements or if the gripping elements 25 and 30 are moved forwardly along the wedge surfaces 35 and 40.

The gripping element 29 and the adjacent wedging surface 39 are arranged in a reverse manner. That is to say, the gripping element 29 is positioned with its fat end facing rearwardly (see FIGS. 4 and 6) while the wedging surface 39 slopes outwardly upon progressing rearwardly. Accordingly, the gripping element 29 is wedged inwardly if the wedging surface 39 moves rearwardly along the gripping element or if the gripping element moves forwardly along the wedging surface. The wedging action is released when the wedging surface 39 moves forwardly along the gripping element 29 or when the gripping element moves rearwardly along the wedging surface.

Each of the gripping elements 25, 29 and 30 is biased to and normally is disposed in a released position in which the gripping element is located out of wedging engagement with the respective wedging surfaces 35, 39 and 40. For this purpose, a spring loaded plunger 41 (FIGS. 5 and 6) is carried by the forward mounting block 24 adjacent the wedging surface 35 while two similar plungers are carried by the rear mounting block 24 adjacent the wedging surfaces 39 and 40. Each plunger bears against a screw 43 extending outwardly from the gripping element and normally presses that screw against an adjustable stop screw 44 threaded into the mounting block. As shown, the gripping elements 25 and 30 are biased forwardly while the gripping element 29 is biased rearwardly.

In order to grip the cable 13, the gripping element 25 coacts with a forward jaw 45 (FIGS. 2 and 5) while the gripping elements 29 and 30 coact with a rear jaw 46 (FIGS. 2, 6 and 7). The two jaws are adapted to be independently moved into and out of clamping engagement with the cable and, in this particular instance, are adapted to be swung from open positions permitting loading of the cable into the tops of the throats 23 and closed positions in which the tops of the throats are closed off. The inner face of the jaw 45 is formed with a plain upper groove 47 (FIG. 2) adapted to coact with the groove 27 in the guide piece 26 to confine and guide the rear cable portion 12 and further is formed with a serrated lower groove 49 which coacts with the gripping element 25 to clamp the forward end portion 11 of the cable. Upper and lower serrated grooves 50 (FIGS. 2 and 7) are formed in the inner face of the rear jaw 46 and coact with the gripping elements 29 and 30 to grip the rear and forward cable end portions 12 and 11, respectively.

Herein, the jaws 45 and 46 are attached rigidly to forward and rear U-shaped yokes 51 and 52 (FIG. 2) which form part of the heads 19 and 20, respectively. Each yoke is fastened to a pivot pin 53 (FIGS. 5 and 7) which is pivotally and slidably received in a pair of elongated slots 54 formed in the respective bottom member 21. Thus, each yoke may be pivoted downwardly from an open position (FIG. 2) to a closed position (FIG. 3) and then may be shifted inwardly to bring the associated jaw into clamping engagement with the cable 13. To effect such shifting, each yoke rotatably supports a shaft 60 (FIGS. 2, 5 and 7) which, in turn, is keyed at 61 to a wheel 63, the axis of the shaft being eccentric with respect to the axis of the wheel so that the latter defines a cam. An operating handle 65 is pivoted at 66 (FIG. 5) to an extension on each shaft 60 and may be grabbed in order to swing the yoke downwardly about the pin 53 and to its closed position. As the yoke is swung downwardly, the cam 63 moves loosely into an arcuate seat 67 (FIGS. 2 and 7) formed in the bottom member 24. Thereafter, the handle may be used to rotate the cam 63 about the axis of the shaft 60 and cause the cam to bear against the seat 67. As a result, the entire yoke 51, 52 is shifted inwardly as permitted by the pin 53 and the slots 54 and thus the jaw 45, 46 is moved broadwise into clamping engagement with the cable 13. The handle 65 then may be swung about the pivot 66 and placed within a fork 69 (FIG. 3) attached to the adjacent yoke 51, 52, the fork serving as a keeper for the handle and thus serving to hold the cam in its rotated or actuated position.

Figure 8:
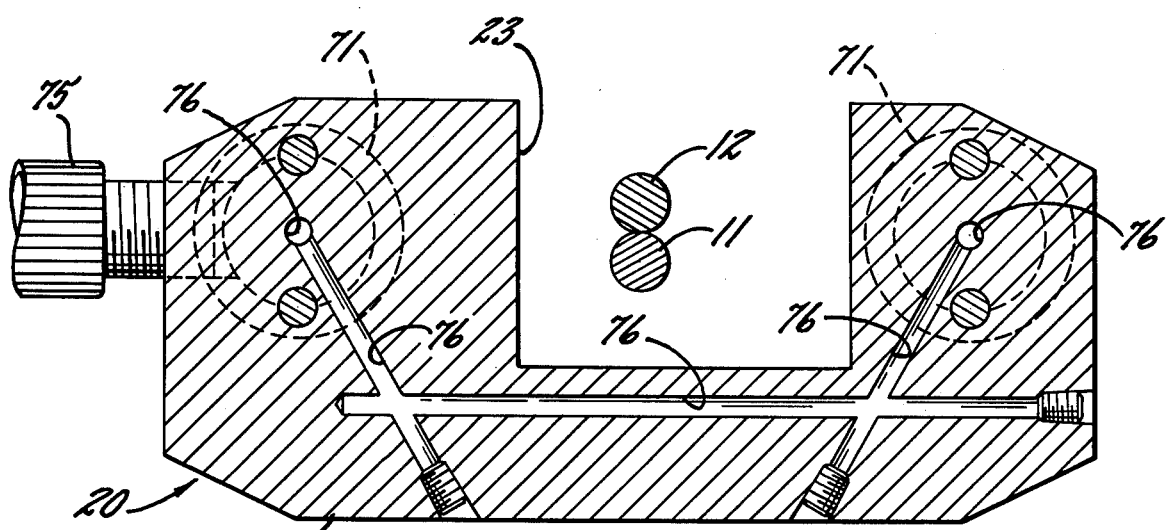

According to one feature of the invention, the longitudinal spacing between the heads 19 and 20 is changed by a plurality of linear actuators 70 (there herein being two such actuators) which are spaced symmetrically around the cable 13 so that each actuator is equally loaded or stressed when the cable is tensioned. In this instance, the actuators are hydraulically operated and each comprises a cylinder 71 (FIGS. 3 and 5) attached at its rear end to the bottom member 21 of the rear head 20 and slidably receiving a rod 73 whose forward end is attached to the bottom member of the forward head 19. A line 75 communicates directly with the rear end of one of the cylinders 71 and also communicates with the rear end of the other cylinder by means of drilled passages 76 (FIG. 8) formed in the bottom member 21 of the rear head 20 and extending between the cylinders. By actuating a portable hand-operated pumping unit (not shown) connected to the line 75, pressurized oil may be introduced into the cylinders to extend the rods and cause the heads 19 and 20 to spread apart. When the oil is released from the cylinders, springs (not shown) in the forward end portions of the cylinders effect retraction of the rods thereby to draw the forward head toward the rear head.

OPERATION

Now that all of the structural elements of the tensioning device 10 have been described, its use and operation will be explained. Preparatory to being loaded with the cable 13, the device is in the condition shown in FIG. 2. Thus, the yokes 51 and 52 are open so as to expose the cable-receiving throats 23 and, in addition, the rods 73 are retracted so as to position the head 19 near the head 20. While in such a condition, the device is located as shown in FIG. 1 with the bottom members 21 being positioned adjacent the article 14 and with the open throats 23 facing away from the article.

The operator then grabs the forward cable end portion 11 and places the same into both throats 23 such that the end portion is received within the grooves of the gripping elements 25 and 30 (see FIG. 5). The rear cable portion 12 next is placed into both throats in overlapping relation with the end portion 11 and is received within the groove of the guide piece 26 and the groove of the gripping element 30 (see FIG. 6).

With the cable end portions 11 and 12 thus threaded into the device 10, the operator swings the yokes 51 and 52 downwardly about the pins 53. During such swinging, the pins 53 are disposed in the outboard end portions of the slots 54 and thus the jaws 45 and 46 clear the cable end portions and move downwardly to positions where the upper and lower grooves in the rear jaw 46 are alined with the grooves of the rear gripping elements 29 and 30, respectively, and the upper and lower grooves in the front jaw 45 are alined with the grooves in the guide piece 26 and the front gripping element 25.

The operator next rotates each operating handle 65 to cause the cams 63 to bear against the seats 67 and shift the yokes 51 and 52 inwardly. This closes the jaws 45 and 46 upon the cable end portions 11 and 12 and causes the forward cable portion 11 to become clamped between the forward jaw 45 and the forward gripping element 25 and also between the rear jaw 46 and the lower rear gripping element 30. The rear cable end portion 12, however, is clamped only between the rear jaw 46 and the upper rear gripping element 29 since the groove 27 in the guide piece 26 and the upper groove 47 in the forward jaw 45 are of such radii as to merely confine and not grip the rear cable end portion 12.

After rotating the handles 65 about the pivots 66 and securing the handles within the forks 69, the operator actuates the pumping unit in order to pressurize the cylinders 71. As a result, the rods 73 extend to shift the forward head 19 forwardly and, at the same time, the rear head 20 is shifted rearwardly. The heads thus are spread apart and the forward cable portion 11 is pulled forwardly by the forward gripping element 25 and the jaw 45 while the rear cable portion is simultaneously pulled rearwardly by the upper rear gripping element 29 and the jaw 46. During such pulling, unequal side loading is avoided and substantially uniform loading is imposed on the heads 19 and 20, the cylinders 71 and the rods 73 by virtue of the symmetrical angular disposition of the cylinders with respect to the cable 13.

Importantly, the gripping elements 25 and 29 self-energize and automatically clamp the cable end portions 11 and 12 with a tighter grip as the heads 19 and 20 are spread apart. That is to say, initial forward shifting of the forward head 19 causes the inclined wedge surface 35 (FIG. 5) of the forward mounting block 24 to move forwardly along and wedge against the gripping element 25, the latter initially remaining substantially stationary as a result of being clamped to the forward cable end portion 11. Because of such wedging action, the gripping element 25 is forced into even tighter clamping engagement with the forward cable portion 11 so that it is virtually impossible for the gripping element to slip. By the same token, initial rearward shifting of the rear head 20 moves the upper inclined wedge surface 39 (FIG. 6) of the rear mounting block 24 rearwardly relative to the upper rear gripping element 29 and thus wedges that gripping element into even tighter engagement with the rear cable portion 12. It should be noted, however, that the lower rear gripping element 30 does not grip and retard forward movement of the forward cable portion 11 during rearward movement of the head 20 but instead merely slides rearwardly along that cable portion. In other words, initial rearward movement of the rear head 20 causes the inclined wedge surface 40 (FIG. 5) to move rearwardly along and out of wedging engagement with the gripping element 30 and thus the associated spring-loaded plunger 41 forces the gripping element forwardly to its released position to free the forward cable end portion from the clamping force previously imposed by the gripping element and the opposing groove in the rear jaw 46.

The operator pressurizes the cylinders 71 to spread the heads 19 and 20 until a preselected amount of tension has been placed in the cable 13, the operator being able to determine the amount of tension by means of a pressure gage (not shown) connected in the line 75. If the desired amount of tension can be placed in the cable before the rods 73 reach the end of their stroke — each rod herein having a stroke of 5½ inches — the operator, while keeping the cylinders pressurized, anchors one or more clamps 15 to the end portions 11 and 12 of the cable at a position or positions located between the two heads. The clamp or clamps bind the two end portions of the cable together and thus maintain the tension imparted to the cable by the tensioning device 10. It is important to note that those parts of the cable directly adjacent the clamp or clamps are actually in tension prior to application of the clamps. Thus, if three clamps 15 are used, all parts of the lapped cable end portions 11 and 12 located between the two outboard clamps remain in tension after the clamps have been secured to and the tensioning device 10 has been released from the cable. Upon release of the tensioning device, tension is lost only in that part of the forward cable end portion 11 located forwardly of the forward clamp and that part of the rear cable end portion 12 located rearwardly of the rear clamp.

After securing the clamp 15 to the cable 13, the operator may rotate the cams 63 to their released positions to enable the yokes 51 and 52 to be swung upwardly to their open positions shown in FIG. 2. Thereafter, the pressure in the cylinders 71 is released and the tensioning device 10 is removed from the cable. The spring-loaded plungers 41 automatically force the gripping elements 25 and 29 to their released positions and facilitate removal of the tensioning device from the cable.

In some instances, sufficient tension may not be imparted to the cable 13 after the rods 73 have moved through their maximum 5½ inch stroke. If this should be the case, the tensioning device 10 can be cycled through another tensioning stroke without need of applying the clamps 15 to maintain the tension previously placed in the cable.

More specifically, progressive cycling of the tensioning device 10 through one or more additional strokes is achieved by the operator opening the forward yoke 51 while leaving the rear yoke 52 closed. When the forward yoke is opened, the lower forward gripping element 25 is effectively released from the forward cable end portion 11. Such end portion then, however, is automatically gripped by the lower rear gripping element 30 and very little tension is lost from the cable. That is to say, release of the lower forward gripping element 25 from the forward cable end portion 11 causes the tension placed in the forward end portion to exert a rearwardly directed force on the lower rear gripping element 30. Such force tends to move the lower rear gripping element 30 in a rearward direction along the inclined wedging surface 40 (FIG. 5) of the rear mounting block 24 and thus that gripping element is wedged into clamping engagement with the forward cable end portion 11 to keep the latter from moving rearwardly and losing its tension. The tension placed in the rear cable portion 12 exerts a force tending to move the upper gripping element 29 forwardly along the adjacent wedge surface 39 and thus the gripping element 29 keeps the cable portion 12 clamped within the rear head 20 to maintain the tension.

With both cable portions 11 and 12 being clamped in the rear head 20, the latter is held in a stationary position along the cable 13. Accordingly, the operator may de-pressurize the cylinders 71 to move the forward head toward the rear head, may close the forward yoke 51 to re-clamp the forward cable end portion with the gripping element 25, and then may re-pressurize the cylinders to shift the forward head 19 forwardly and impart additional tension to the cable in the same manner as during the previous stroke. Thus, the device 10 may be operated through successive strokes without need of applying the clamps 15 to the cable between strokes.

From the foregoing, it will be apparent that the present invention brings to the art a new and improved cable tensioning device 10 which possesses numerous advantages over prior devices. The present device has a total pull capacity of 10 tons but, because of its unique construction, weighs just slightly more than 20 pounds and thus can be handled easily by a single operator.

I claim:

1. A device for tensioning a cable having first and second lapped end portions, said device comprising first and second members spaced from one another along said cable, a plurality of reversible linear actuators spaced symmetrically around said cable and connected to said members for changing the spacing between said members, said first and second members having first and second cable-receiving openings, respectively, each adapted to accept said first and second cable end portions, means attached to and movable in unison with said first and second members and disposed within said first and second openings for gripping and pulling said first and second cable end portions, respectively, and thereby tension the cable when said actuators are actuated to change the spacing between said members, said gripping and pulling means in one of said openings retaining its grip on the gripped cable end portion and substantially retaining the latter in its pulled position when said actuators are reversed and reversely change the spacing between said members, said device further including means within said one opening for automatically gripping the other cable end portion and substantially retaining the latter in its pulled position when said actuators are reversed, and mechanism for enabling the gripping and pulling means in the other opening to be released from the gripped cable end portion whereby the spacing between said members may be changed reversely to enable said cable end portions to be again gripped and pulled upon the next actuation of said actuators while substantially retaining the previous tension placed in said cable.

2. A device for tensioning a cable having first and second lapped end portions, said device comprising first and second members spaced from one another along said cable, linear actuators connected between said members and spaced symmetrically around said cable, said actuators being operable when actuated in one direction to spread said members apart and being operable when actuated in the opposite direction to draw said first member toward said second member, said first and second members having first and second cable-receiving openings, respectively, each adapted to accept said first and second cable end portions, first and second gripping elements slidably mounted within the respective openings, jaws opposing each of said gripping elements, means selectively operable to shift said jaws toward said gripping elements to clamp the cable end portions between the respective gripping elements and the jaws and also operable to shift said jaws away from said gripping elements to enable said cable end portions to be placed between said jaws and said elements, said jaws being movable independently of said gripping elements, said gripping elements being carried on the respective members and being operable when clamped to pull said first and second cable end portions in opposite directions as said members are spread apart whereby said cable is tensioned, each of said gripping elements having an inclined wedge surface, inclined wedge surfaces on said members and wedgably engaging the wedge surfaces of said gripping elements to automatically force the latter into tighter clamping engagement with said cable end portions as an incident to spreading of said members, and resilient means acting on said gripping elements for automatically shifting the wedge surfaces of said gripping elements out of wedging engagement with the wedge surfaces on said members when said jaws are unclamped from said cable end portions.

3. A device for tensioning a cable as defined in claim 2 in which said first gripping element may be released out of clamping engagement with said first cable end portion while said second gripping element is retained in clamping engagement with said second cable end portion, said device further including an additional gripping element carried by said second member and located in said second opening to receive said first cable end portion, said additional gripping element sliding along said first cable end portion when said members are spread apart, an inclined wedge surface on said additional gripping element, and an additional inclined wedge surface on said second member and wedgably engaging the inclined wedge surface of said additional gripping element when said first gripping element is released from said first cable end portion whereby said said additional gripping element is forced into clamping engagement with said first cable end portion and coacts with said first gripping element to retain the tension in said cable as said actuators draw said first member toward said second member.

4. A device for tensioning a cable having first and second lapped end portions, said device comprising first and second members spaced from one another along said cable, a plurality of reversible linear actuators spaced symmetrically around said cable and connected to said members for changing the spacing between said members, said first and second members having first and second cable-receiving openings, respectively, each adapted to accept said first and second cable end portions, first and second gripping elements slidably mounted within the respective openings, a third gripping element slidably mounted within said first opening, a first jaw opposing said first and third gripping elements, a second jaw opposing said second gripping element, means selectively operable to shift said jaws toward said gripping elements to clamp the first cable end portion between said first gripping element and said first jaw and to clamp said second cable end portion between said third gripping element and said first jaw and also between said second gripping element and said second jaw, said means also being selectively operable to shift said jaws away from said gripping elements to release said cable end portions and to shift said second jaw away from said second gripping element without shifting said first jaw away from said first and third gripping elements whereby said second gripping element may be released from said second cable end portion while such end portion remains clamped by said third gripping element and while said first cable end portion remains clamped by said first gripping element, said first and second gripping elements gripping and pulling said first and second cable end portions, respectively, and thereby imparting tension to said cable when said actuators are actuated to increase the spacing between said members, means carried on said members and acting on said first and second gripping elements to force the latter into tighter gripping engagement with the respective cable end portions as the spacing between said members is increased, means carried by said first member and acting on said third gripping element to release the latter from gripping engagement with said second cable end portion as the spacing between said members is increased, and means acting on said third gripping element to shift the latter back into gripping engagement with said second cable end portion when said second jaw is shifted away from said second gripping element and releases said second cable end portion whereby said third gripping element substantially retains said second cable end portion in its pulled position.

* * * * *